Dec. 7, 1926.

G. H. WITMAN 1,609,924

SOUND MUFFLING DEVICE

Filed May 23, 1924      2 Sheets-Sheet 1

Inventor
George H. Witman
By Joshua R. H. Potts
His Attorney

Dec. 7, 1926.

G. H. WITMAN

SOUND MUFFLING DEVICE

Filed May 23, 1924     2 Sheets-Sheet 2

1,609,924

Witnesses:

Inventor
George H. Witman
By Joshua R. H. Potts
His Attorney

Patented Dec. 7, 1926.

1,609,924

UNITED STATES PATENT OFFICE.

GEORGE H. WITMAN, OF DARBY, PENNSYLVANIA.

SOUND-MUFFLING DEVICE.

Application filed May 23, 1924. Serial No. 715,473.

My invention relates to muffling devices for sounds produced by currents of air and it is more particularly adapted for use in muffling sounds produced by pipe-organ blowers.

When air is supplied to pipe organs by power-operated fans, action of the fans produces air vibrations which are audible as buzzing sounds and which, unless stifled, interfere with the tones of the organ and are highly objectionable. The pressure in the air line leading to the organ is high when the organ is temporarily silent or is being played softly, and is low when the organ is being played loudly, and the buzzing sounds are most in evidence when the pressure in the air line is high. Many attempts have been made to obviate this objection but, as far as I am aware, the problem has never been adequately solved. None of the devices heretofore used completely muffle the objectionable sounds and most of them needlessly interfere with the flow of air when the organ consumption is large.

The object of my invention is to provide a simple and durable device which will completely extinguish the audible vibrations and which will automatically adjust itself to function properly whether the organ consumption of air is high or low.

This object, and other advantageous ends which will be described hereinafter, I attain in the following manner, reference being had to the accompanying drawings in which—

Figure 1:
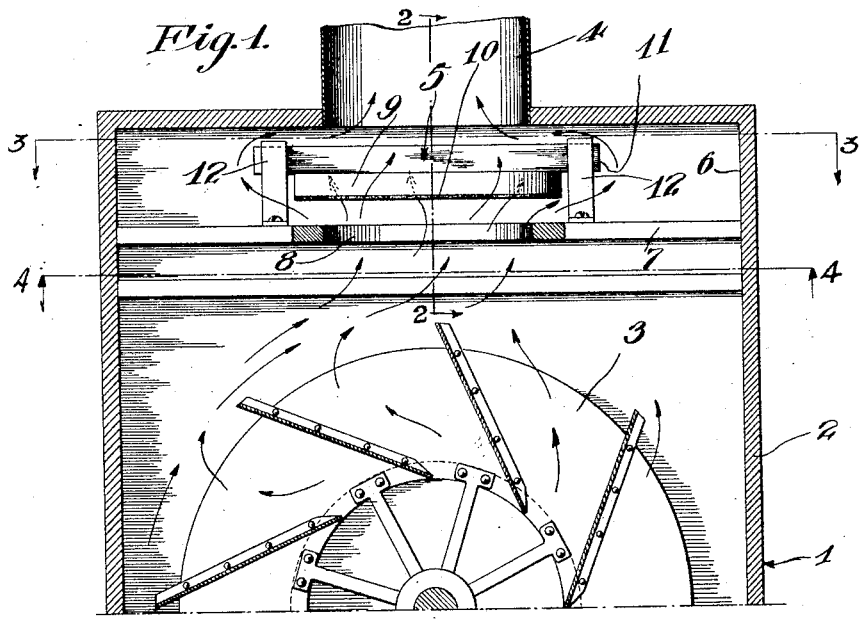
Figure 2:
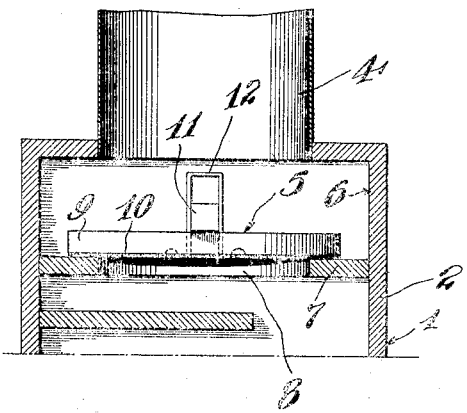
Figure 3:
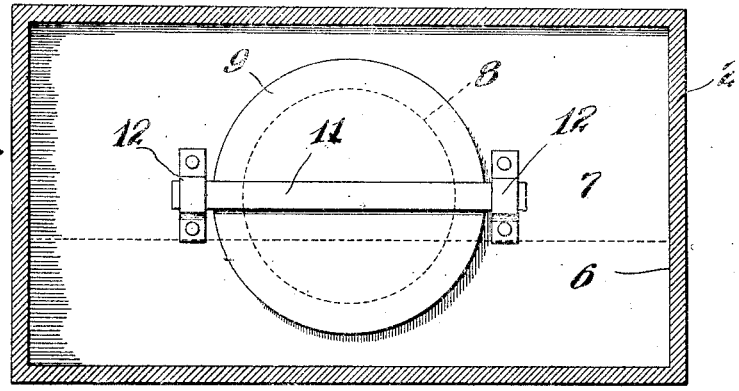
Figure 4:
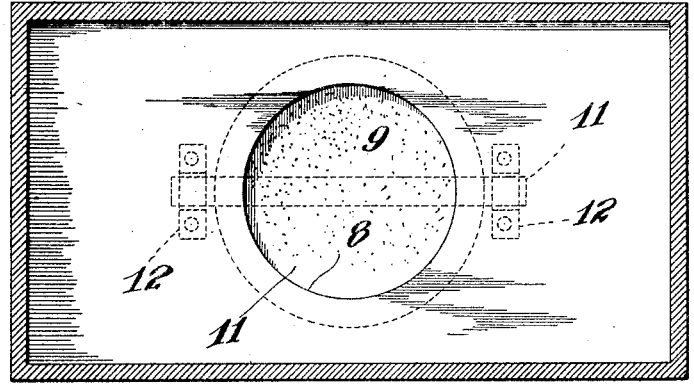

Figure 1 is a fragmentary central section through a blower and an air line leading to the organ showing my invention applied thereto, Figure 2 a section on line 2—2 of Figure 1 but showing the valve in a closed position, and Figures 3 and 4 sections on line 3—3 and 4—4 of Figure 1.

Referring to the drawings, 1 indicates a blower consisting of a casing 2 and a fan 3, 4 an air line leading from the blower to an organ, and 5 my sound muffling device interposed between the blower and the air line.

The sound muffling device includes a casing 6, shown as a continuation of the blower casing but separated therefrom by a horizontally disposed partition 7 having a flat upper face and a central air passage 8 communicating with the blower casing, the partition serving as the bottom wall of the muffler casing. A disk 9 of larger diameter than the air passage and having on its under face a coating 10 of felt or other fibrous material, is adapted to engage the upper face of the partition and close the air passage when the fan is idle. The disk carries a bar 11 whose extremities are freely slidable in inverted U-shaped guide members 12 extending upwardly from partition 7. The above described device has the characteristics of and operates similarly to a check valve, as follows: When the fan is started the pressure of the air will raise the disk and permit flow of air into the organ pipeline. The distance to which the disk will rise depends upon the difference in pressure in the blower casing and the pressure tending to resist upward movement of the disk. With the organ silent the pressure above the disk will increase until the pressure above and below is approximately equal and the disk will fall until the space between the disk and the partition is, at the most, a mere slit. Thereafter the disk will automatically rise or fall as the organ consumption of air increases or decreases.

The weight of the disk should be such as to require a substantial difference in the air pressure above and below to hold it materially above the partition.

Actual use of my device shows that, whether the organ is played softly or loudly, no buzzing sounds interfere with the tones of the organ.

While I prefer to place my muffling device adjacent the blower casing, it will function if placed elsewhere between the blower and the organ.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A check valve adapted to regulate air pressure in a conduit including a casing having a bottom wall with an air inlet passage and a top wall with an air outlet passage, a valve plate adapted to close the air in the passage by gravity and free to move upwardly from the air inlet passage toward the air outlet passage in response to differences in air pressure, U-shaped guide members extending upwardly from the bottom wall, a bar fixed on and extending across the top of the valve plate and freely movable in said guide members, substantially as described.

2. A check valve adapted to regulate air pressure in a conduit including a casing having a bottom wall with an air inlet passage and a top wall with an air outlet passage, a disk valve adapted by gravity to close or partly close the inlet passage, U-shaped guide members extending upwardly from the bottom wall and terminating at a level below the air outlet passage, a bar fixed on and extending across the top of the disk valve and having its extremities freely slidable in said U-shaped guide members, and the said disk valve and bar being free to move bodily upwards within the U-shaped guide members in response to differences in air pressure above and below said valve.

3. A check valve adapted to regulate air pressure in a conduit including a casing having a bottom wall with an air inlet passage and a top wall with an air outlet passage, a disk valve adapted by gravity to close or partly close the inlet passage, U-shaped guide members extending upwardly from the bottom wall and terminating at a level below the air outlet passage, a bar fixed on and extending across the top of the disk valve and having its extremities freely slidable in said U-shaped guide members, the said disk valve and bar being free to move bodily upwards within the U-shaped guide members in response to differences in air pressure above and below said valve, and the under side of said disk valve being covered with fibrous material whereby noises in the air conduit are muffled, substantially as described.

In testimony whereof I have signed my name to this specification.

GEORGE H. WITMAN.